(12) United States Patent
Elliott et al.

(10) Patent No.: US 6,493,161 B1
(45) Date of Patent: Dec. 10, 2002

(54) PULSE-MODE WRITER

(75) Inventors: Carl F. Elliott, Eden Prairie, MN (US); John D. Leighton, Anoka, MN (US); Sally A. Doherty, Afton, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/476,016

(22) Filed: Dec. 31, 1999

Related U.S. Application Data

(60) Provisional application No. 60/160,738, filed on Oct. 20, 1999.

(51) Int. Cl.[7] .............................. G11B 5/09; G11B 5/02
(52) U.S. Cl. ........................................... 360/46; 360/40
(58) Field of Search .............................. 360/46, 45, 44, 360/40, 50, 68

(56) References Cited

U.S. PATENT DOCUMENTS 4,625,245 A * 11/1986 White ......................... 360/40
6,301,068 B1 * 10/2001 Ionescu ....................... 360/68

* cited by examiner

*Primary Examiner*—David Hudspeth
*Assistant Examiner*—Varsha Kapadia
(74) *Attorney, Agent, or Firm*—Kinney & Lange, P.A.

(57) ABSTRACT

A pulse-mode data writing protocol is disclosed which reduces the time required to implement a transition in the direction of magnetization of a recording medium, and which reduces the total power required to encode a given data sequence. After a magnetic transition is encoded on the medium by generating a write current pulse through the write head, the write current through the recording head is reduced, thereby utilizing the spatial extent of the write bubble to encode the lack of a transition on the medium. Alternate configurations are disclosed for various scenarios of write bubble size versus maximum cell size, all utilizing the principle of the invention.

19 Claims, 7 Drawing Sheets

PULSE-MODE WRITER

CROSS-REFERENCE TO RELATED APPLICATION(S)

This application claims the benefit of Provisional Application No. 60/160,738 filed Oct. 20, 1999 for "Pulse-Mode Writer" by Carl F. Elliott, John D. Leighton and Sally A. Doherty.

BACKGROUND OF THE INVENTION

The present invention relates to a method and apparatus for operating inductive magnetic write heads for use in magnetic storage devices, such as magnetic disk drives, tape drives and the like.

A typical system for writing data to a magnetic medium employs an inductive write head having a high permeability magnetic core. The core has a nonmagnetic gap that creates a stray magnetic field in response to a current flowing through the write head, with the magnetic field ultimately writing the data. A sufficient writing field must be applied to the magnetic medium in order to record data. Specifically, the magnetic field strength of the stray field emanating from the gap must at least exceed the coercivity of the magnetic medium in order for data to be recorded. It is common in the industry to refer to the fringing field as contour lines of equal strength. The terms "bubble" or "write bubble" are used to represent the contour line of field strength equal to the coercivity of the medium. The strength of the stray field inside the write bubble is greater than the coercive field of the magnetic medium. Likewise, the strength of the stray field outside of the bubble, and therefore further from the gap, is less than the coercivity of the magnetic medium.

As the magnetic medium passes adjacent the gap, the magnetic field from the head magnetizes the medium in a selected direction based on the direction of the magnetic field, and hence the direction of current in the coil. The magnetization remains in the orientation established by the magnetic field after the magnetic field has been removed, so the magnetic pattern recorded in the medium can later be "read" by another magnetic read head. As explained above, the magnetic field from the gap includes a region in which the magnetic field exceeds the coercivity of the medium, which is known as the magnetic "bubble" or "write bubble" utilized to encode a desired magnetic pattern on the medium. The magnetization of the medium within the bubble is oriented to the direction of the field within the write bubble. As the magnetic medium moves relative to the head, the magnetic field from the head continues to orient the magnetization of the medium as it passes through the bubble. Thus, with reference to FIGS. 1 and 2, magnetic head 10 includes an inductive write element including magnetic core 12 with coil 14 winding around magnet 12 to carry the field-generating current. Opposite poles of magnetic core 12 confront one another across gap 16. Magnetic sensor 18 for reading the written data is located adjacent to the inductive write element, with magnetic shield 20 adjacent to sensor 18, thereby providing functionality of a read/write head. Application of a current through coil 14 generates a magnetic field at the air bearing surface 24 of the head, which extends into magnetic medium 26. The magnetic field within bubble 22 is strong enough to orient the magnetization of medium 26 based on the direction of current in coil 14 of head 10, while the magnetic field outside of bubble 22 is not strong enough to orient the magnetization of medium 26. The region within medium 26 in which the magnetization is oriented comprises the region bounded by dimensions L0 and R0, at the forward and trailing edges of influence of bubble 22. As medium 26 moves in the direction indicated by arrow v, bubble 22 writes along the track to a position bounded by positions L1 and R1. Hence, the magnetization orientation due to current in coil 14 of head 10 after successive time increments encompasses the region between L0 and R1.

A single bit cell may be quite smaller than the region between L0 and R1, and may encompass only that portion of the region between L0 and L1. Consequently, if a current reversal in coil 14 of head 10 causes a reversal of a magnetic field when medium 26 is in the position illustrated in FIG. 2, bubble 22 orients the dipoles oppositely, thereby reorienting the dipoles in the region between L1 and R1 and overwriting that portion of the medium between L1 and R0 that had been written when medium 26 was in the position illustrated in FIG. 1. In this manner, data are written with bit cells in the medium smaller than the bubble, specifically having a spatial extent bounded by L0 and L1.

Most magnetic disk drive systems store data by defining each magnetic transition in the medium as a binary "1" and the lack of a transition as a binary "0". Clock recovery techniques recover clock information from the frequency of data recorded on the media. These circuits rely on the presence of frequent transitions (binary 1s) in order to synchronize to the data. Consequently, run length limited codes are employed to ensure that long streams of binary 0s do not occur. Most magnetic disk drives employ run length limited codes limiting the number of consecutive binary 0s to a number between six and twelve.

Most writer circuits for writing data via magnetic write heads operate on the principle of reversing the direction of current in the coil of the head and maintaining a reasonably steady state current level until the next transition. Thus, as illustrated in FIG. 3, a transition at time T0, representing a binary 1, reverses the direction of current through the coil from positive to negative between steady state levels of $+I_W$ and $-I_W$. The current remains at a steady state level of $-I_W$ until time T5, representing four consecutive binary 0s, when the current is again reversed to $+I_W$, representing another binary 1. (FIG. 3 shows a peak or spike in the current at the transitions, caused by current overshoot that is often generated to help decrease the current and magnetic field reversal time in the head.)

The present invention is directed to a pulse-mode writer that modifies the write current waveform to change the steady state current conditions of the write driver circuit, and instead employs pulses to record transitions and takes advantage of the enlarged size of the magnetic bubble to record the lack of transitions that signify binary 0s.

BRIEF SUMMARY OF THE INVENTION

The present invention is a pulse-mode data writing protocol which reduces the time required to implement a transition in the direction of magnetization of a recording medium, and which reduces the total power required to encode a given data sequence. After a magnetic transition is encoded on the medium by generating a write current pulse through the write head, the write current through the recording head is reduced, thereby utilizing the spatial extent of the write bubble to encode the lack of a transition on the medium. Alternate configurations of the present invention may be implemented for various scenarios of write bubble size versus maximum cell size, with each configuration utilizing the principle of the invention to reduce the write current at some point between magnetic transitions to reduce the power and transition time of the system.

DETAILED DESCRIPTION

The general design and operation of a disk drive write head is discussed above and shown in FIGS. 1–3. The present invention, as described below and shown in FIGS. 4–10, is a pulse-mode writer that is operable in a number of configurations to write data to the disk with a reduced time of head field reversal and reduced power consumption.

Figure 4:
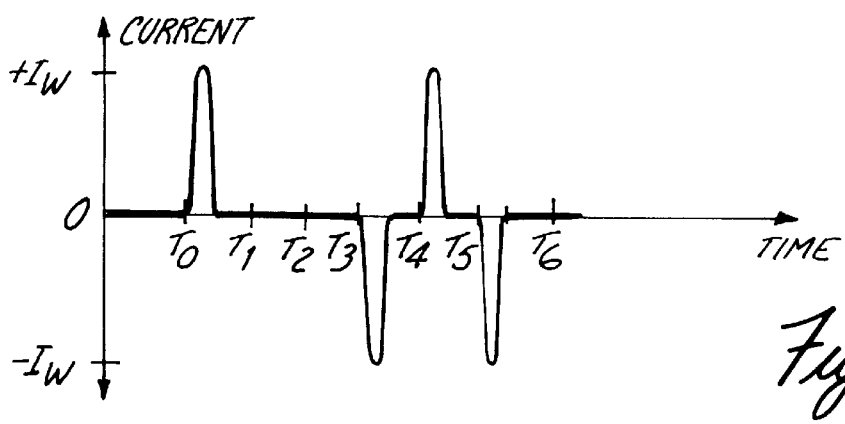
FIG. 4 is an illustration of a waveform of a write circuit operating as a pulse-mode writer in accordance with a first embodiment of the present invention employing zero steady state write current.

FIG. 4 is an illustration of a waveform of a write circuit operating as a pulse-mode writer in accordance with a first embodiment of the present invention, employing zero steady state write current. The length of consecutive binary 0s (that is, the run-length limit of the encoding scheme) is typically limited to between six and twelve, as mentioned above. The embodiment of the invention producing the waveform of FIG. 4 operates in a disk drive configuration where the spatial extent of a maximum cell (6 to 12 data bit cells, depending on the run length limit of the encoding scheme) is smaller than the spatial extent of the write bubble produced by the head (see FIGS. 1 and 2). In this event, even for a number of consecutive binary 0s where no transitions occur, the entire number of cells up to the run length limit can be encoded by a single pulse, without maintaining a steady-state write current. In other words, the trailing edge of the maximum cell is within the spatial extent of the write bubble (between L0 and R0, FIGS. 1 and 2).

FIG. 4 shows an example of an encoding sequence having a transition (binary 1) at time T0, no transitions (binary 0s) at times T1 and T2, transitions (binary 1s) at times T3, T4 and T5, and no transition (binary 0) at time T6, for a data string of 1001110. A positive ($+I_W$) pulse is generated to encode the transition at time T0, while the write current returns to zero after the pulse is complete. The write current remains at zero at times T1 and T2, effectively encoding the lack of a transition on the medium. It is certain that the medium is magnetized the same as it was at time T0 (that is, there will be no transition) because the extent of the write bubble at time T0 included the portion of the medium that would be encoded at times T1 and T2. Therefore, the write current need not be maintained at a steady-state value to encode the lack of a transition. A negative ($-I_W$) pulse is generated to encode a transition at time T3, with the write current again returning to zero after the pulse is complete. A positive pulse is generated to encode another transition at time T4, and a negative pulse is generated at time T5 to encode yet another transition. The write current remains at zero at time T6 to encode the lack of a transition. By utilizing the pulse-mode writing protocol shown in FIG. 4, the time required to implement a transition in the magnetization of the medium is reduced (since the current need only rise from 0 to $I_W$ rather than from $-I_W$ to $+I_W$, and vice versa) and the total power required to encode any given data sequence is reduced as well, compared to the writing protocol of the prior art.

Figure 5:
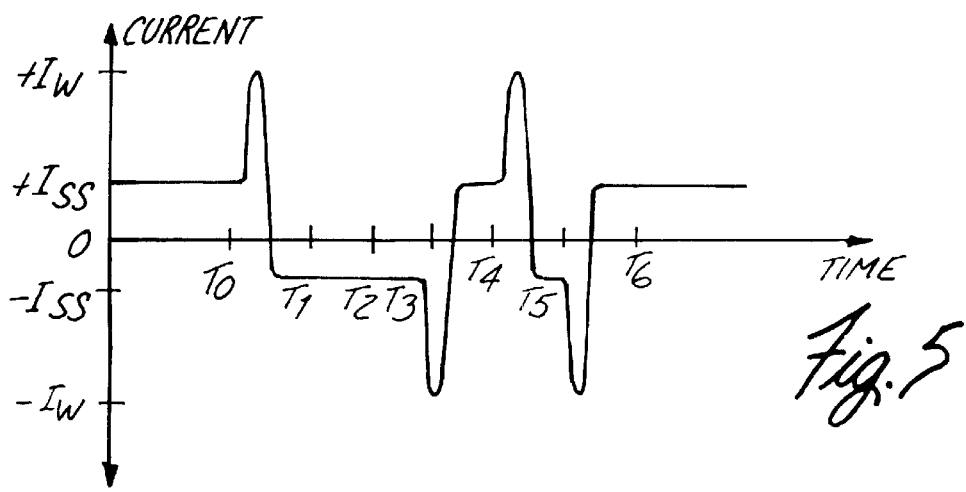
FIG. 5 is an illustration of a waveform of a write circuit operating as a pulse-mode writer in accordance with an alternate version of the first embodiment of the present invention employing opposite polarity steady state write current.

FIG. 5 is an illustration of a waveform of a write circuit operating as a pulse-mode writer in accordance with an alternate version of the first embodiment of the present invention, employing a non-zero opposite polarity steady state write current. Similar to the first embodiment described above with respect to FIG. 4, the second embodiment of the invention producing the waveform of FIG. 5 operates in a disk drive configuration where the spatial extent of a maximum cell is smaller than the spatial extent of the write bubble produced by the head. As in FIG. 4, FIG. 5 shows an example of an encoding sequence having a transition (binary 1) at time T0, no transitions (binary 0s) at times T1 and T2, transitions (binary 1s) at times T3, T4 and T5, and no transition (binary 0) at time T6, for a data string of 1001110. The transitions are encoded by positive and negative pulses ($+I_W$ and $-I_W$) in the same manner as described above with respect to FIG. 4. However, the second embodiment of the invention reduces the current after a pulse is complete to a non-zero steady-state value of the opposite polarity as the pulse, but below the value of current necessary to generate a magnetic field in excess of the coercivity of the medium and thereby encode a transition. Specifically, following a positive ($+I_W$) pulse, the current is set to a negative steady-state value ($-I_{SS}$), and following a negative ($-I_W$) pulse, the current is set to a positive steady-state value ($+I_{SS}$). This alternate version of the first embodiment utilizes more power than the protocol shown in FIG. 4, since some value of steady-state current is maintained between pulses. However, the time required to implement a transition in the magnetization of the medium is further reduced by this embodiment, since the write current swing is reduced from $I_W$ to $I_W$ minus $I_{SS}$.

Figure 6:
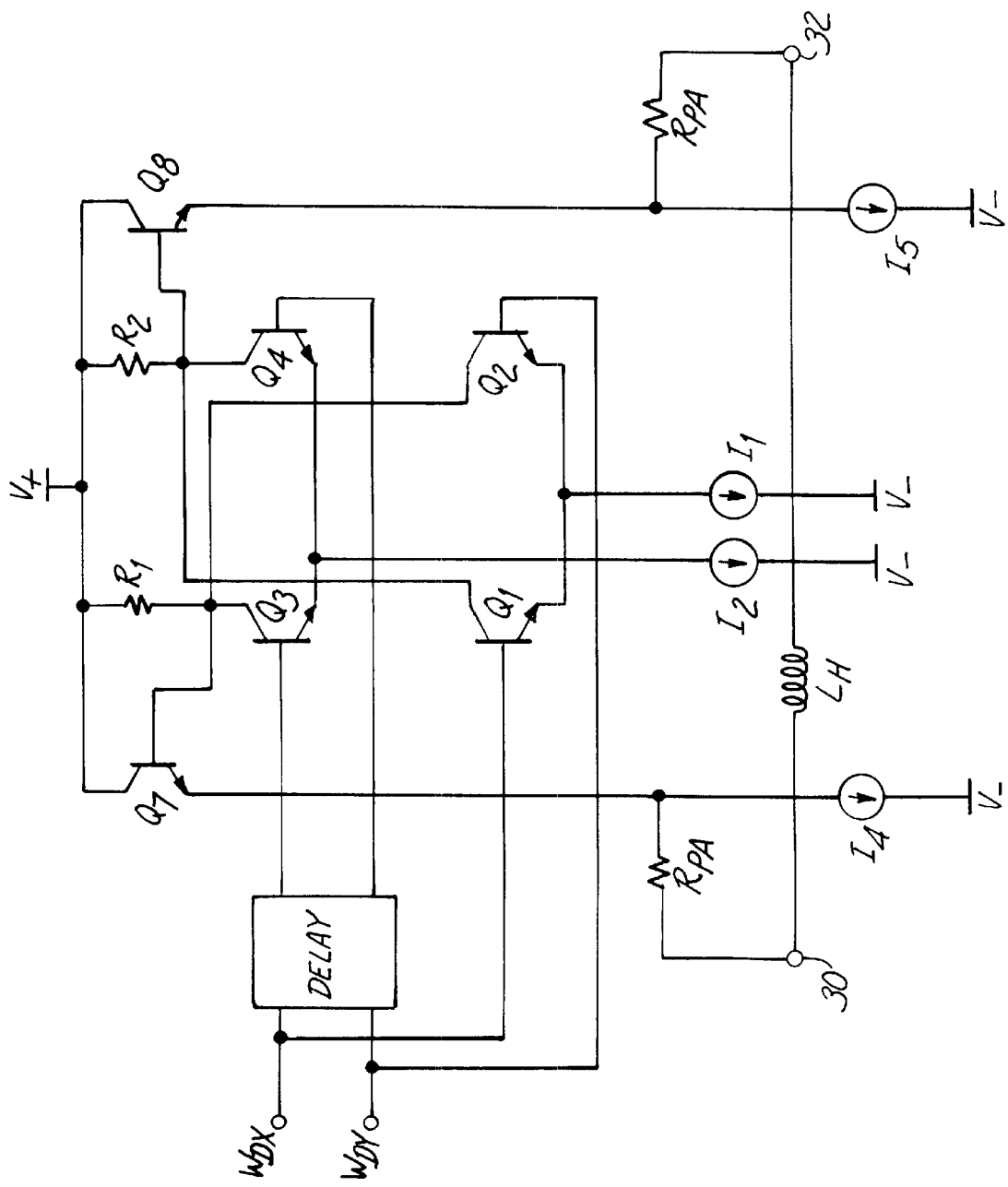
FIG. 6 is a schematic diagram of a write circuit for producing the waveforms shown in FIGS. 4 and 5.

FIG. 6 is a schematic diagram of a write circuit for producing the waveforms shown in FIGS. 4 and 5. Two complementary input signals ($W_{DX}$ and $W_{DY}$) are provided to control the encoding of data by the write circuit, as is known in the art. The $W_{DX}$ signal is input to the base of transistor Q1 and the $W_{DY}$ signal is input to the base of transistor Q2, with transistors Q1 and Q2 having common emitters connected through current source I1 to a fixed voltage level V−. The $W_{DX}$ signal is also delayed and input to the base of transistor Q3, and the $W_{DY}$ signal is likewise delayed and input to the base of transistor Q4. Transistors Q3 and Q4 also have a common emitter, which is connected through current source I2 to fixed voltage level V−. The collector of transistor Q1 is connected to the collector of transistor Q4, and the collector of transistor Q2 is connected to the collector of transistor Q3. Resistor R1 is connected between the collector of transistor Q3 and fixed voltage level V+, and resistor R2 is connected between the collector of transistor Q4 and fixed voltage level V+. Transistor Q7 has its base connected to the collector of transistor Q3 and its collector connected to fixed voltage level V+. Transistor Q8 has its base connected to the collector of transistor Q4 and its collector connected to fixed voltage level V+. The emitter of transistor Q7 is connected through current source 14 to fixed voltage level V−, and also through resistor $R_{PA}$ to head terminal 30. The emitter of transistor Q8 is connected through current source I5 to fixed voltage level V−, and also through another resistor $R_{PA}$ to head terminal 32. Write head $L_H$ is connected between head terminals 30 and 32.

In operation, data signals $W_{DX}$ and $W_{DY}$ control the write circuit in a complementary manner. When data signal $W_{DX}$ is high, data signal $W_{DY}$ is low, and vice versa. A magnetic transition is encoded on the medium when the data signals switch from high to low and from low to high, while maintaining the data signals constant encodes the lack of a transition. Given an initial state of $W_{DX}$=low and $W_{DY}$=high, a switch of $W_{DX}$ to high and $W_{DY}$ to low will encode a transition. In the initial state where $W_{DX}$ was low and $W_{DY}$ was high, transistors Q2 and Q4 are turned on while transistors Q1 and Q3 are turned off. Therefore, transistor Q4 conducts a current equal to current source I2, and transistor Q2 conducts a current equal to current source I1. Transistors Q7 and Q8 act as emitter-followers and cause current to flow through preamplifier resistors $R_{PA}$ and write head $L_H$. Preamplifier resistors $R_{PA}$ have a value chosen for impedance matching with the interconnect that connects the preamplifier to the head, for desirable operation of the circuit. In order to produce the waveform shown in FIG. 4, where the steady-state current is zero, current sources I1 and I2 are equal and resistors R1 and R2 are equal, with current sources I4 and I5 being larger than the write current to ensure that emitter-follower transistors Q7 and Q8 are able to operate properly. The equality of current sources I1 and I2 and of resistors R1 and R2 ensures that no net current flows through write head $L_H$ in the steady-state condition, since the voltages at the bases of transistors Q7 and Q8 are equal and therefore the voltages at the emitters of transistors Q7 and Q8 are also equal, such that there is no voltage difference across head $L_H$ and preamplifier resistors $R_{PA}$. In order to produce the waveform shown in FIG. 5, where the steady-state current has a non-zero value, current sources I1 and I2 are different, with the difference between the current sources, as well as the values of resistors R1 and R2 (which are still equal) controlling the voltage difference across preamplifier resistors $R_{PA}$ and head $L_H$, and the values of preamplifier resistors $R_{PA}$ also contributing to controlling the steady-state value of net write current though write head $L_H$.

Upon the occurrence of a transition, when $W_{DX}$ switches high and $W_{DY}$ switches low, transistor Q1 turns on and transistor Q2 turns off. Transistor Q3 remains off and transistor Q4 remains on, though, since the switching of data signals $W_{DX}$ and $W_{DY}$ is delayed by a selected delay time. Therefore, both transistors Q1 and Q4 conduct a current equal to respective current sources I1 and I2. Meanwhile, transistors Q2 and Q3 are off. Transistors Q7 and Q8 act as emitter-followers to set the voltages at the emitters of transistors Q7 and Q8 a diode drop below the voltages at the bases of transistors Q7 and Q8. The voltage at the base of transistor Q7 (collector of transistor Q3) is equal to V+, since no current flows through resistor R1, and the voltage at the base of transistor Q8 (collector of transistor Q4) is equal to V+minus (I1+I2)R2. Therefore, switching of the input signals and the operation of emitter-follower transistors Q7 and Q8 causes a voltage difference across head $L_H$ and both of preamplifier resistors $R_{PA}$. Thus, the write current through the head is controlled by the magnitude of that voltage difference (controlled by the sum of current sources I1 and I2 and the values of resistors R1 and R2) and the values of preamplifier resistors $R_{PA}$. After the delay time has expired, the switching of data signals $W_{DX}$ and $W_{DY}$ takes effect on transistors Q3 and Q4 to turn transistor Q3 on and to turn transistor Q4 off. Therefore, after the delay, the write circuit returns to steady-state operation, with the net current through write head $L_H$ being controlled by the difference (if any) between current sources I1 and I2. A difference between current sources I1 and I2 will cause the voltages at the collectors of transistors Q3 and Q4 and thereby the voltages at the emitters of transistors Q7 and Q8 to differ, setting a non-zero voltage across preamplifier resistors $R_{PA}$ and head $L_H$ in the steady-state. The widths of the write current pulses are controlled by the delay time of the delay element employed in the circuit. An opposite pulse, resulting in an opposite voltage difference across head $L_H$ and preamplifier resistors $R_{PA}$, is produced by opposite switching of write data signals $W_{DX}$ and $W_{DY}$.

Figure 7:
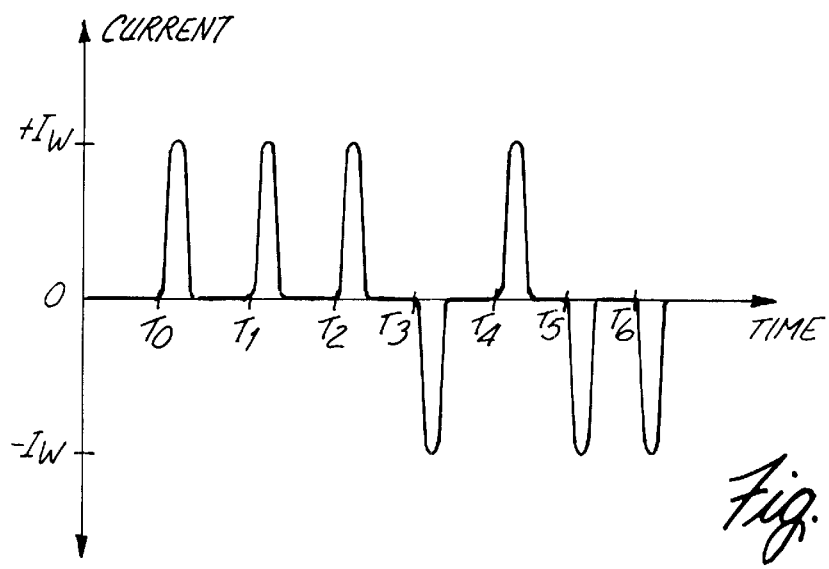
FIG. 7 is an illustration of a waveform of a write circuit operating as a pulse-mode writer in accordance with a second embodiment of the present invention.

If the spatial extent of a maximum cell (the number of bit cells equal to the run-length limit of the encoding scheme) is larger than the spatial extent of the write bubble produced by the head (FIGS. 1 and 2), an alternative protocol may be used to reduce or eliminate the need for a steady-state write current. One example of such a protocol is illustrated in FIG. 7, in accordance with a second embodiment of the present invention. Similar to the first embodiment described above with respect to FIGS. 4 and 5, the third embodiment of the invention producing the waveform of FIG. 7 is operated to encode a data sequence having a transition (binary 1) at time T0, no transitions (binary 0s) at times T1 and T2, transitions (binary 1s) at times T3, T4 and T5, and no transition (binary 0) at time T6, for a data string of 1001110. A positive ($+I_W$) pulse is generated to encode the transition at time T0, while the write current returns to zero after the pulse is complete. Because the spatial extent of the write bubble produced by the head is smaller than the maximum cell size, it is not certain that the lack of a transition can be encoded by merely reducing the write current below the medium coercivity threshold, since the data bit cells could encompass a portion of the medium that was not in the spatial extent of the write bubble when the transition was originally encoded. Therefore, in order to encode the lack of a transition (binary 0) at times T1 and T2, additional positive ($+I_W$) pulses are generated. A negative ($-I_W$) pulse is generated to encode a transition at time T3, a positive pulse is generated to encode another transition at time T4, and a negative pulse is generated to encode yet another transition at time T5. Another negative pulse is generated at time T6 to encode the lack of a transition. Compared to the prior art, the pulse-mode protocol shown in FIG. 7 reduces the time required to implement a transition in the magnetization of the medium, since the current swings only from 0 to $I_W$ rather than from $-I_W$ to $+I_W$, and the total power required to encode a given data sequence is reduced since the write current returns to zero between pulses.

Figure 8:
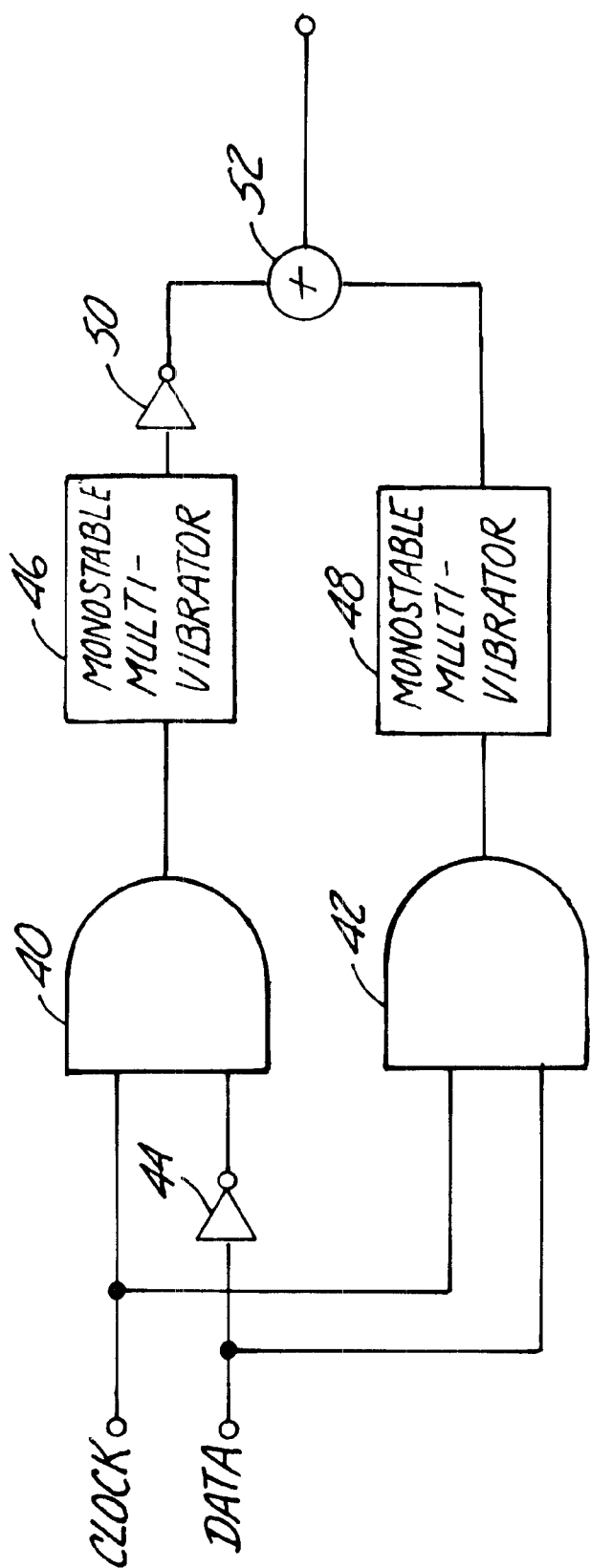
FIG. 8 is a logical block diagram of a write circuit for producing the waveform shown in FIG. 7.

FIG. 8 is a logical block diagram of a write circuit for producing the waveform shown in FIG. 7. Two input signals are provided to the write circuit, including a CLOCK signal and a DATA signal. The CLOCK signal is simply a periodic square wave function, while the DATA signal is a logic waveform that is either high or low. The CLOCK signal sets the frequency of the pulses used to encode data, while the DATA signal determines the polarity of the pulse. As shown in FIG. 7, either a positive or negative pulse is produced for each bit cell to be encoded. The configuration shown in FIG. 8 includes a pair of AND gates 40 and 42, with AND gate 40 receiving as inputs the CLOCK signal and the DATA signal after it is inverted by inverter 44, and AND gate 42 receiving as inputs the CLOCK signal and the DATA signal itself. The output of AND gate 40 is input to monostable multivibrator 46, and the output of AND gate 42 is input to monostable multivibrator 48. Thus, monostable multivibrator 46 will produce a pulse when the DATA signal is low, and monostable multivibrator 48 will produce a pulse when the DATA signal is high. Inverter 50 is provided to invert the output of monostable multivibrator 46 so that the pulses generated by monostable multivibrator 46 serve as the negative pulses in the write circuit protocol. The positive pulses (monostable multivibrator 48) and negative pulses (monostable multivibrator 46) are combined by summer 52 so as to provide a single output to the write head having the proper sequence of positive and negative pulses to encode a desired data string.

Similar to the first embodiment described above with respect to FIGS. 4–6, the second embodiment of the invention may alternatively be implemented to employ a non-zero steady state write current, so as to generate a field that does not exceed the coercivity of the magnetic medium. However, since a pulse is required to encode both a transition and the lack of a transition on the medium, the reduction in time required to implement a transition in the magnetization of the medium is not achievable with the second embodiment as it is in the first embodiment, since the write current cannot consistently be reduced to a steady state value having the opposite polarity as the previous write current pulse.

Figure 1:
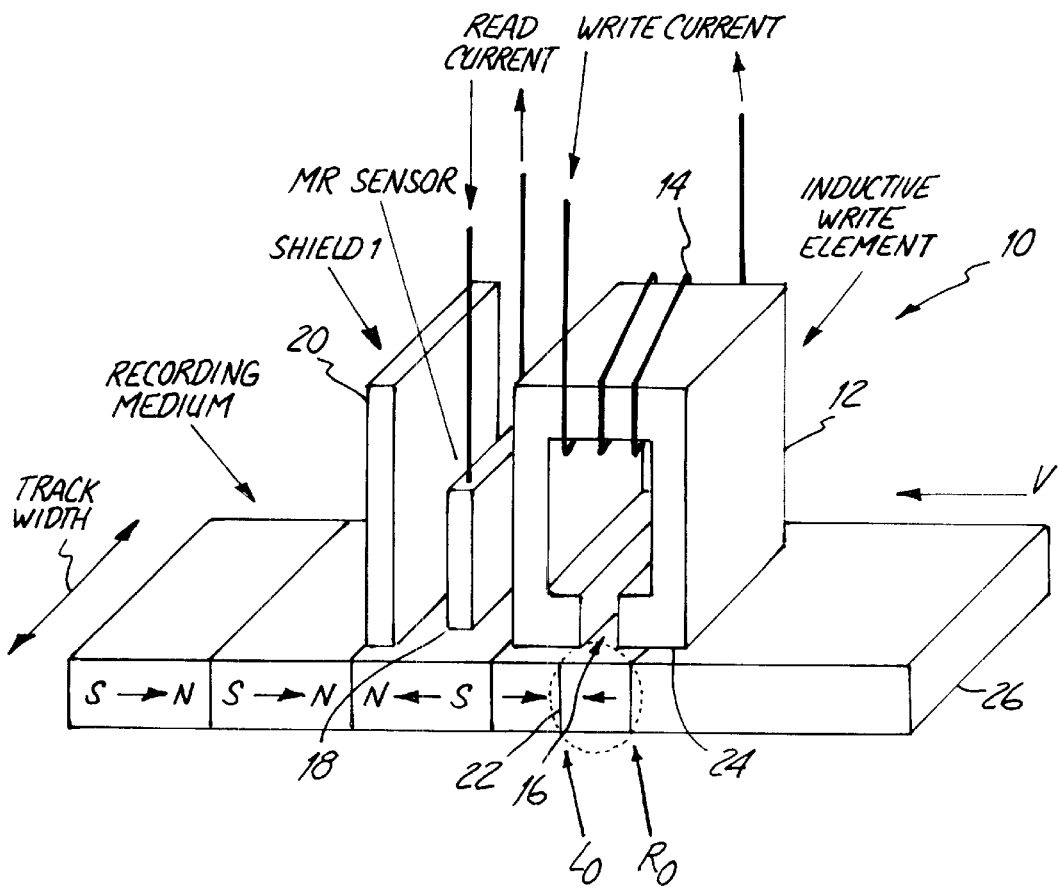
FIGS. 1 and 2 are illustrations of the section view of an inductive magnetic write head and magnetic medium in the process of writing data.
Figure 2:
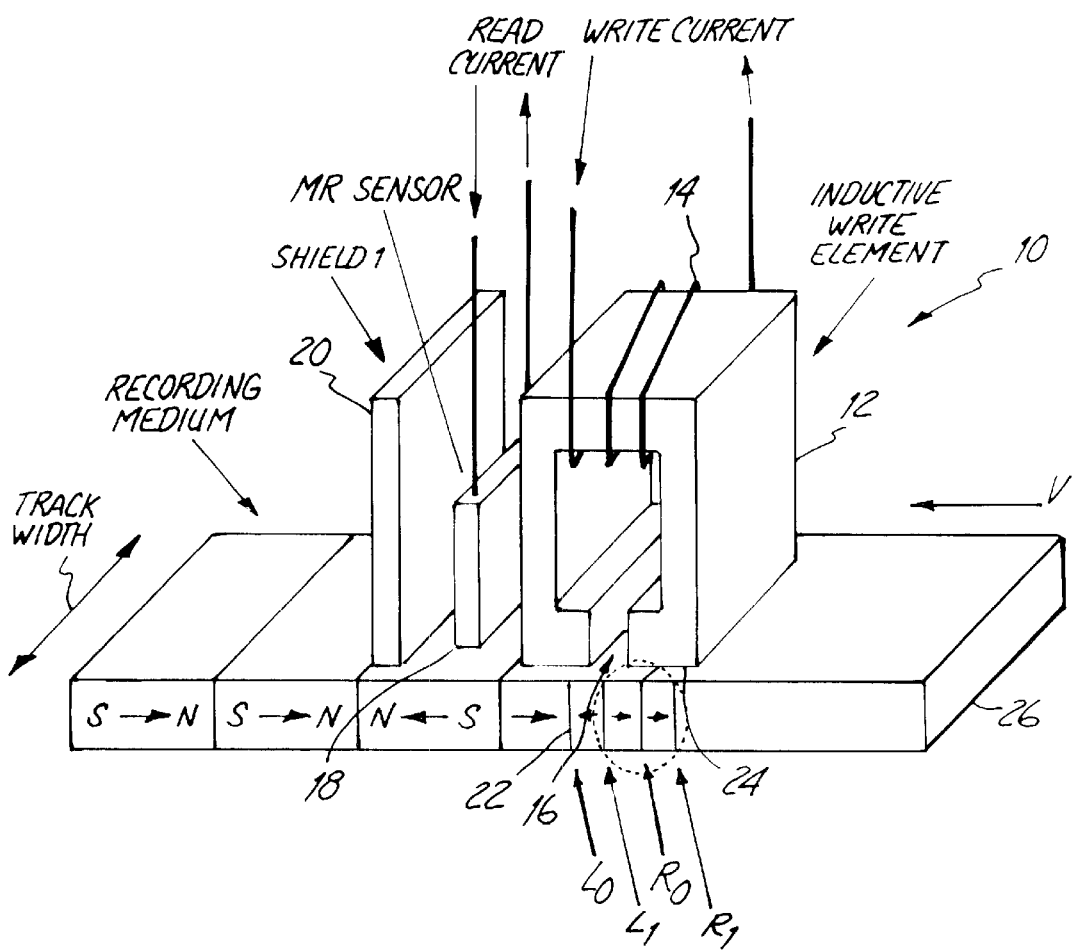
Figure 3:
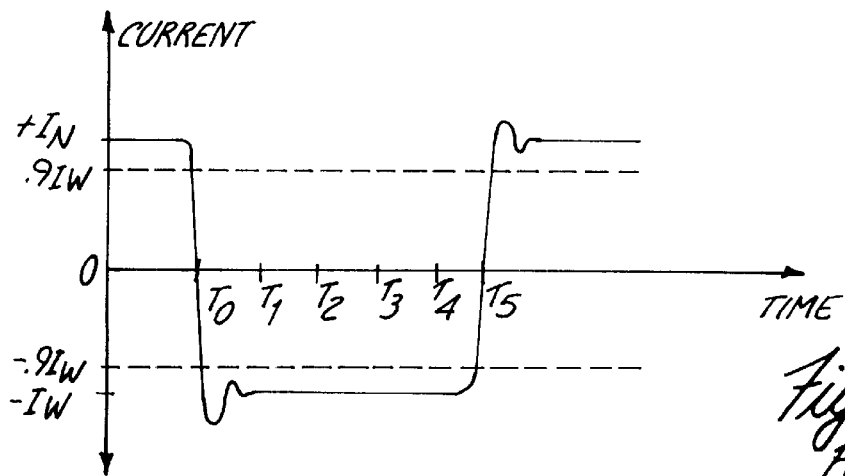
FIG. 3 is an illustration of a waveform of a write circuit for a head such as illustrated in FIGS. 1 and 2 operated in accordance with the prior art.
Figure 9:
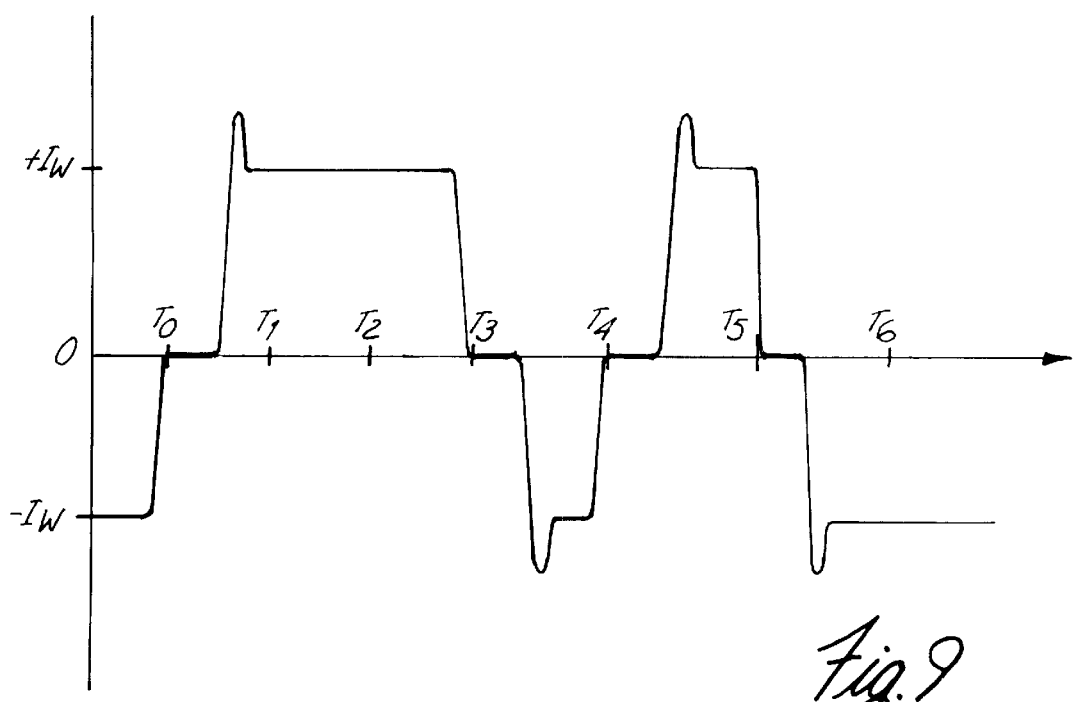
FIG. 9 is an illustration of a waveform of a write circuit operating as a pulse-mode writer in accordance with a third embodiment of the present invention.

FIG. 9 is an illustration of a waveform of a write circuit operating as a pulse-mode writer in accordance with a third embodiment of the present invention. Similar to the protocol shown in FIG. 7, the protocol shown in FIG. 9 is applicable to a situation where the spatial extent of a maximum cell (the number of bit cells equal to the run-length limit of the encoding scheme) is larger than the spatial extent of the write bubble produced by the head (FIGS. 1 and 2). As in FIG. 7, FIG. 9 shows an example of an encoding sequence for a data string of 1001110. The waveform of FIG. 9 is similar to the prior art waveform shown in FIG. 3, in that a transition is encoded by a write current swing to a value of $+I_W$ or $-I_W$, and the lack of a transition is encoded by maintaining a value of write current great enough to generate a field that exceeds the medium coercivity threshold. However, the protocol shown in FIG. 9 provides the advantages of reduced rise times and reduced power consumption by dropping the write current to zero shortly before a transition is to occur. This is shown in FIG. 9 shortly before the transitions at times T3, T4 and T5. Such a write current drop may be implemented in the protocol of the third embodiment of the invention as long as spatial extent of the write bubble produced by the head is at least larger than a single data bit cell.

Figure 10:
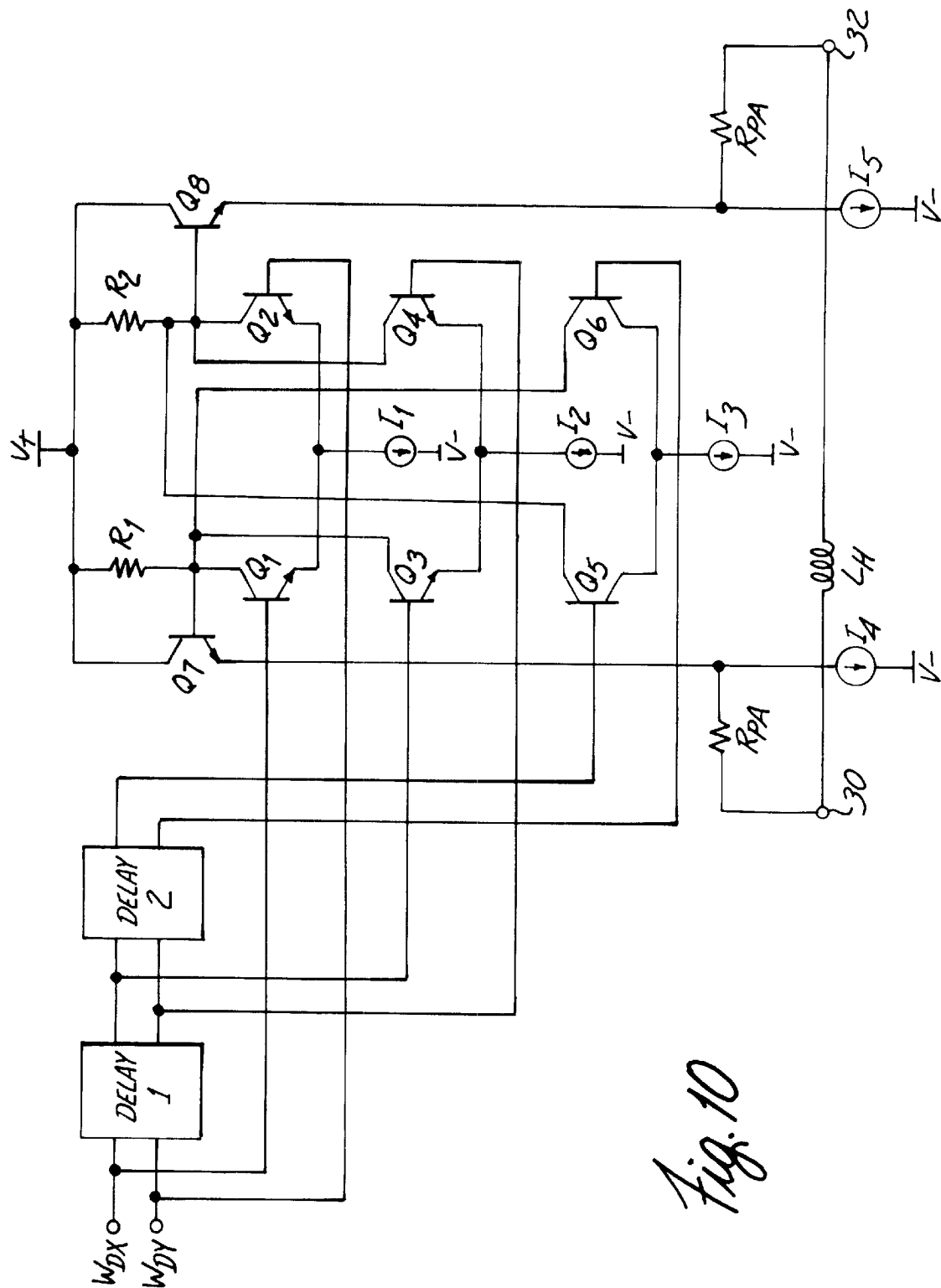
FIG. 10 is a schematic diagram of a write circuit for producing the waveform shown in FIG. 9.

FIG. 10 is a schematic diagram of a write circuit for producing the waveform shown in FIG. 9. Two complementary input signals ($W_{DX}$ and $W_{DY}$) are provided to control the encoding of data by the write circuit, as is known in the art. The $W_{DX}$ signal is input to the base of transistor Q1 and the $W_{DY}$ signal is input to the base of transistor Q2, with transistors Q1 and Q2 having common emitters connected through current source I1 to a fixed voltage level V−. The $W_{DX}$ signal is also delayed once and input to the base of transistor Q3, and the $W_{DY}$ signal is likewise delayed once and input to the base of transistor Q4. The $W_{DX}$ signal is further delayed twice and input to the base of transistor Q5, and the $W_{DY}$ signal is likewise delayed twice and input to the base of transistor Q6. Transistors Q3 and Q4 have a common emitter, which is connected through current source 12 to fixed voltage level V−. Similarly, transistors Q5 and Q6 have a common emitter, which is connected through current source 13 to fixed voltage level V−. The collector of transistor Q1 is connected to the collectors of transistors Q4 and Q6, and the collector of transistor Q2 is connected to the collectors of transistors Q3 and Q5. Resistor R1 is connected between the collector of transistor Q1 and fixed voltage level V+, and resistor R2 is connected between the collector of transistor Q2 and fixed voltage level V+. Transistor Q7 has its base connected to the collector of transistor Q1 and its collector connected to fixed voltage level V+. Transistor Q8 has its base connected to the collector of transistor Q2 and its collector connected to fixed voltage level V+. The emitter of transistor Q7 is connected through current source 14 to fixed voltage level V−, and also through resistor $R_{PA}$ to head terminal 30. The emitter of transistor Q8 is connected through current source 15 to fixed voltage level V−, and also through another resistor $R_{PA}$ to head terminal 32. Write head $L_H$ is connected between head terminals 30 and 32.

In operation, data signals $W_{DX}$ and $W_{DY}$ control the write circuit in a complementary manner. In an initial state of $W_{DX}$=low and $W_{DY}$=high, transistors Q2, Q4 and Q6 are turned on while transistors Q1, Q3 and Q5 are turned off. Therefore, transistors Q2, Q4 and Q6 all conduct a current equal to respective current sources I1, I2, and I3. Transistors Q7 and Q8 act as emitter-followers to set the voltages at the emitters of transistors Q7 and Q8 a diode drop below the voltages at the bases of transistors Q7 and Q8. The voltage at the base of transistor Q7 (collector of transistor Q1) is equal to V+minus I3•R1, and the voltage at the base of transistor Q8 (collector of transistor Q2) is equal to V+minus (I1+I2)R2. In order to produce the waveform shown in FIG. 9, where the steady-state current is equal to $I_{SS}$, the values of current sources I1, I2 and I3 are chosen to establish a voltage difference across preamplifier resistors $R_{PA}$ and head $L_H$ in this steady-state condition.

Upon the occurrence of a transition, when $W_{DX}$ switches high and $W_{DY}$ switches low, transistor Q1 turns on and transistor Q2 turns off. Transistors Q3 and Q5 remain off and transistors Q4 and Q6 remain on, though, since the switching of data signals $W_{DX}$ and $W_{DY}$ is delayed as they are input to those transistors. Therefore, transistors Q1, Q4 and Q6 all conduct a current equal to respective current sources I1, I2 and I3. Transistors Q7 and Q8 act as emitter-followers to set the voltages at the emitter of transistors Q7 and Q8 a diode drop below the voltages at the bases of transistors Q7 and Q8. The voltage at the base of transistor Q7 (collector of transistor Q1) is equal to V+minus (I1+I3)R1, and the voltage at the base of transistor Q8 (collector of transistor Q2) is equal to V+minus I2•R2. In order to produce the waveform shown in FIG. 9, where the current drops to zero immediately before a magnetic transition is encoded, current sources I1, I2 and I3 have values such that I1+I3 equals I2, with resistors R1 and R2 being equal. Therefore, in this state, there is no voltage difference across preamplifier resistors $R_{PA}$ and head $L_H$, and therefore no net current flow through the head. The duration of this state is controlled by the delay time of the first delay element (DELAY1) employed in the circuit.

After the first time delay (DELAY1) has expired, the switching of data signals $W_{DX}$ and $W_{DY}$ takes effect on transistors Q3 and Q4 to turn transistor Q3 on and to turn transistor Q4 off. Transistor Q5 remains off and transistor Q6 remains on. Therefore, transistors Q1, Q3 and Q6 all conduct a current equal to respective current sources I1, I2 and I3. Transistors Q7 and Q8 act as emitter-followers to set the voltages at the emitters of transistors Q7 and Q8 a diode drop below the voltages at the bases of transistor Q7 and Q8. The voltage at the base of transistor Q7 (collector of transistor Q1) is equal to V+minus (I1+I2+I3)R1, and the voltage at the base of transistor Q8 (collector of transistor Q2) is equal to V+, since no current flows through resistor R2. Therefore, the voltage difference across preamplifier resistors $R_{PA}$ and head $L_H$ is controlled by the sum of the values of current sources I1, I2 and I3 and the value of resistor R1. This voltage difference causes a write current pulse to flow through preamplifier resistors $R_{PA}$ and head $L_H$, with the value of the write current being controlled by the voltage difference across preamplifier resistors $R_{PA}$ and head $L_H$ and by the values of preamplifier resistors $R_{PA}$. The widths of the write current pulses are controlled by the delay time of the second delay element (DELAY2) employed in the circuit.

After the second delay time (DELAY2) has expired, the switching of data signals $W_{DX}$ and $W_{DY}$ takes effect on transistors Q5 and Q6 to turn transistor Q5 on and to turn transistor Q6 off. Therefore, transistors Q1, Q3 and Q5 all conduct a current equal to respective current sources I1, I2 and I3. This is the steady-state condition of opposite polarity to the initial steady-state, as previously discussed above. An opposite pulse sequence, resulting in a write current pulse of opposite polarity, is produced by opposite switching of write data signals $W_{DX}$ and $W_{DY}$.

It should be noted with respect to the circuit of FIG. 10 as it is utilized to produce the waveform of FIG. 9 that the response of the circuit to a switch in the data signals $W_{DX}$ and $W_{DY}$ is to drop the write current to zero (or another value below the critical current for generating a magnetic field in excess of the medium's coercivity), rather than to immediately encode a magnetic transition on the medium. After a delay period (set by the DELAY1 element) has expired, the magnetic transition is encoded by generating an appropriate write current pulse. This protocol enables a reduction in power and in the write current rise time, even for a situation where the size of the write bubble cannot be completely utilized to encode the lack of a transition (that is, some steady-state write current is required to ensure that the lack of a transition is encoded on the medium). The delay period can be chosen to reduce the power utilized by the write circuit as much as is possible based on the write bubble's size in relation to the maximum cell size, with a larger write bubble enabling a larger delay period to be utilized, since the steady-state write current will not be required for as long of a period when the write bubble size is large.

The various embodiments of the present invention described above introduce a new data writing protocol called pulse-mode writing. The protocol utilizes the size of the write bubble produced by the write head to reduce or eliminate the need to maintain a steady state write current while encoding the lack of a transition (binary 0) on the data medium. As a result, the time required to implement a transition in the magnetization of the medium is improved due to the reduction in the write current swing required to encode a transition, and the power consumption of the write circuit is also reduced.

The circuit implementations of the protocol of the present invention described above are intended to be exemplary in nature. It will be understood by those skilled in the art that other modified arrangements of known circuit elements may also be employed to achieve the data writing protocols of the present invention. Such arrangements are within the scope of the present invention.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

What is claimed is:

1. A method of writing data in an encoding scheme on a recording medium with a write head, wherein the encoding scheme defines a plurality of bit cells on the medium and is characterized by a run-length limit of successive bit cells having a lack of a magnetic transition, the method comprising:

providing a first write current in a first direction through the write head that is greater than a threshold current required to create a magnetic field that exceeds a coercivity of the recording medium, the first write current generating a write bubble that encompasses a number of bit cells that is no less than the run-length limit of the encoding scheme;

providing, after the step of providing the first write current, a second write current through the write head that is less than the threshold current required to create a magnetic field that exceeds a coercivity of the recording medium;

providing, after the step of providing the second write current, a third write current in a second direction opposite the first direction through the write head that is greater than the threshold current required to create a magnetic field that exceeds a coercivity of the recording medium, the third write current generating a write bubble that encompasses a number of bit cells that is no less than the run-length limit of the encoding scheme;

providing after the step of providing the third write current, a fourth write current through the write head that is less than the threshold current required to create a magnetic field that exceeds a coercivity of the recording medium; and repeating the steps of providing the first, second, third and fourth write currents in a manner appropriate to encode a desired magnetic field pattern on the recording medium.

2. The method of claim 1, wherein the second current and the fourth current are equal to zero.

3. The method of claim 1, wherein the second current is provided in the second direction and the fourth current is provided in the first direction.

4. The method of claim 1, wherein the first current is a first current pulse and the second current is a first steady state current provided immediately after the first current pulse has ended, and the third current is a second current pulse and the fourth current is a second steady state current provided immediately after the second current pulse has ended.

5. The method of claim 1, further comprising:

providing a fifth write current, between the step of providing the first current and the step of providing the second current, through the head in the first direction that is greater than the threshold current required to create a magnetic field that exceeds a coercivity of the recording medium; and providing a sixth current, between the step of providing the third write current and the step of providing the fourth write current, through the head in the second direction that is greater than the threshold current required to create a magnetic field that exceeds a coercivity of the recording medium.

6. The method of claim 5, wherein the first write current is a first current pulse, the fifth current is a first steady state current provided immediately after the first current pulse has ended, and the second current is provided for a selected time before a magnetic transition is to be encoded, and wherein the third current is a second current pulse, the sixth current is second steady state current provided immediately after the second current pulse has ended, and the fourth current is provided for a selected time before a magnetic transition is to be encoded.

7. A method of writing data in an encoding scheme on a recording medium with a write head, the write head producing a write bubble having a spatial extent that is greater than a spatial extent of a maximum cell determined by a run-length limit of the encoding scheme, the method comprising:

encoding magnetic transitions on the medium by generating a write current pulse through the write head to create a magnetic field in the write bubble that exceeds a coercivity of the recording medium;

reducing the write current following the encoding of a magnetic transition to a steady state value below a current value necessary to create a magnetic field in the write bubble that exceeds the coercivity of the recording medium; and encoding a lack of a transition on the medium by maintaining the write current at the steady state value below the current necessary to create a magnetic field in the write bubble that exceeds the coercivity of the recording medium.

8. The method of claim 7, wherein the steady state value of write current is zero.

9. The method of claim 7, wherein the steady state value of write current is a non-zero amount having a polarity opposite to a polarity of a previous write current pulse.

10. A method of writing data in an encoding scheme on a recording medium with a write head, the write head producing a write bubble having a spatial extent that is less than a spatial extent of a maximum cell determined by a run-length limit of the encoding scheme, the method comprising:

encoding magnetic transitions representing a first logical value on the medium by generating a write current pulse through the write head to create a magnetic field in the write bubble that exceeds a coercivity of the recording medium;

reducing the write current following the encoding of a magnetic transition to a steady state value below a current value necessary to create a magnetic field in the write bubble that exceeds the coercivity of the recording medium; and encoding a lack of a transition representing a second logical value on the medium by generating an additional write current pulse through the write head to create a magnetic field in the write bubble that exceeds a coercivity of the recording medium, the additional write current pulse having the same polarity as a polarity of a previous write current pulse through the write head.

11. The method of claim 10, wherein the steady state value of write current is zero.

12. A method of writing data in an encoding scheme on a recording medium with a write head, the write head producing a write bubble having a spatial extent that is less than a spatial extent of a maximum cell determined by a run-length limit of the encoding scheme, the method comprising:

encoding magnetic transitions on the medium by generating a write current pulse through the write head to create a magnetic field in the write bubble that exceeds a coercivity of the recording medium and maintaining the write current at a first value above a current value necessary to create a magnetic field in the write bubble that exceeds the coercivity of the recording medium;

encoding a lack of a transition on the medium by maintaining the write current at the first value above the current necessary to create a magnetic field in the write bubble that exceeds the coercivity of the recording medium; and upon the occurrence of a control signal indicating a transition is to be encoded, reducing the write current for a predetermined time period to a second value below the current value necessary to create a magnetic field in the write bubble that exceeds the coercivity of the recording medium, and then implementing the step of encoding a magnetic transition.

13. The method of claim 12, wherein the second value of write current is equal to zero.

14. The method of claim 12, wherein the second value of write current is equal to a non-zero value having a polarity opposite to a polarity of a previous write current pulse.

15. A method of writing data in an encoding scheme on a recording medium with a write head, the method comprising:

providing a first write current in a first direction through the write head that is greater than a threshold current required to create a magnetic field that exceeds a coercivity of the recording medium;

providing, after the step of providing the first write current, a second write current in a second direction opposite the first direction through the write head that is less than the threshold current;

providing, after the step of providing the second write current, a third write current in the second direction through the write head that is greater than the threshold current;

providing, after the step of providing the third write current, a fourth write current in the first direction through the write head that is less than the threshold current; and repeating the steps of providing the first, second, third and fourth write currents in a manner appropriate to encode a desired magnetic field pattern on the recording medium.

16. The method of claim 15, wherein the first current is a first current pulse and the second current is a first steady state current provided immediately after the first current pulse has ended, and the third current is a second current pulse and the fourth current is a second steady state current provided immediately after the second current pulse has ended.

17. The method of claim 15, further comprising:

providing a fifth write current, between the step of providing the first current and the step of providing the second current, through the head in the first direction that is greater than the threshold current required to create a magnetic field that exceeds a coercivity of the recording medium; and providing a sixth current, between the step of providing the third write current and the step of providing the fourth write current, through the head in the second direction that is greater than the threshold current required to create a magnetic field that exceeds a coercivity of the recording medium.

18. The method of claim 17, wherein the first write current is a first current pulse, the fifth current is a first steady state current provided immediately after the first current pulse has ended, and the second current is provided for a selected time before a magnetic transition is to be encoded, and wherein the third current is a second current pulse, the sixth current is second steady state current provided immediately after the second current pulse has ended, and the fourth current is provided for a selected time before a magnetic transition is to be encoded.

19. The method of claim 15, wherein the write head producing a write bubble having a spatial extent that is greater than a spatial extent of a maximum cell determined by a run-length limit of the encoding scheme; and wherein the first, second, third and fourth write currents encode magnetic transitions and lack of transitions on the recording medium by generating a write current pulse through the write head to create a magnetic field in the write bubble that exceeds a coercivity of the recording medium and by maintaining the write current at the steady state value below the current necessary to create a magnetic field in the write bubble, respectively.

* * * * *